United States Patent
Song

(10) Patent No.: US 7,280,177 B2
(45) Date of Patent: Oct. 9, 2007

(54) LIQUID CRYSTAL DISPLAY AND THIN FILM TRANSISTOR ARRAY PANEL THEREFOR

(75) Inventor: Jang-Kun Song, Seoul (KR)

(73) Assignee: Samsung Electronics Co., Ltd. (KR)

( * ) Notice: Subject to any disclaimer, the term of this patent is extended or adjusted under 35 U.S.C. 154(b) by 397 days.

(21) Appl. No.: 11/043,157

(22) Filed: Jan. 27, 2005

(65) Prior Publication Data

US 2005/0122457 A1 Jun. 9, 2005

Related U.S. Application Data

(63) Continuation of application No. 10/602,710, filed on Jun. 25, 2003, now Pat. No. 6,850,302.

(30) Foreign Application Priority Data

Jun. 28, 2002 (KR) ............................... 2002-36979

(51) Int. Cl.
*G02F 1/136* (2006.01)
(52) U.S. Cl. ..................................... 349/148
(58) Field of Classification Search ................. 349/48, 349/144, 147
See application file for complete search history.

(56) References Cited

U.S. PATENT DOCUMENTS

| | | | |
|---|---|---|---|
| 5,162,931 A * | 11/1992 | Holmberg | 349/54 |
| 6,028,577 A | 2/2000 | Sakamoto | |
| 6,040,882 A | 3/2000 | Jun et al. | |
| 6,229,589 B1 * | 5/2001 | Koma | 349/139 |
| 6,313,899 B1 * | 11/2001 | Wu et al. | 349/130 |
| 6,342,938 B1 * | 1/2002 | Song et al. | 349/143 |
| 6,356,335 B1 * | 3/2002 | Kim et al. | 349/156 |
| 6,384,889 B1 * | 5/2002 | Miyachi et al. | 349/143 |
| 6,400,440 B1 * | 6/2002 | Colgan et al. | 349/160 |
| 6,710,825 B2 | 3/2004 | Kubo et al. | 349/48 |
| 6,724,359 B2 | 4/2004 | Yamamoto et al. | 345/92 |
| 6,724,450 B1 | 4/2004 | Knoll et al. | 349/129 |
| 6,741,314 B2 | 5/2004 | Song | 349/144 |
| 2004/0125253 A1 | 7/2004 | Kim et al. | 349/43 |
| 2004/0125295 A1 | 7/2004 | Kim et al. | 349/129 |

FOREIGN PATENT DOCUMENTS

| | | |
|---|---|---|
| EP | 0 884 626 A2 | 12/1998 |
| JP | 2204727 | 8/1990 |
| JP | 09-179141 | 7/1997 |

* cited by examiner

*Primary Examiner*—James A. Dudek
(74) *Attorney, Agent, or Firm*—F. Chau & Assoc., LLC

(57) ABSTRACT

A liquid crystal display (LCD) is provided, which includes: first and second gate lines, a data line intersecting the gate lines, first to fourth drain electrodes located near the intersections between the first and second gate lines and the data line, and a coupling electrode. First to fourth pixel electrodes respectively connected to the first to fourth drain electrodes are also provided, and the first pixel electrode is connected to the coupling electrode while the fourth pixel electrode overlaps the coupling electrode. The LCD further includes a common electrode opposite the pixel electrodes, a liquid crystal layer interposed between the pixel electrodes and the common electrode, and a domain partitioning member formed on at least one of the pixel lelectrode and the common electrode. Two long edges of the domains are angled with respect to the first and the second gate lines or the data line substantially by about 45°.

17 Claims, 7 Drawing Sheets

LIQUID CRYSTAL DISPLAY AND THIN FILM TRANSISTOR ARRAY PANEL THEREFOR

CROSS REFERENCE TO PRIOR APPLICATIONS

This application is a Continuation Application from a U.S. patent application Ser. No. 10/602,710 filed on Jun. 25, 2003 now U.S. Pat. No. 6,850,302, which claims the benefit of Korean Patent Application No. 2002-0036979, filed on Jun. 28, 2002, which is hereby incorporated by reference for all purposes as if fully set forth herein.

BACKGROUND OF THE INVENTION (a) Field of the Invention

The present invention relates to a liquid crystal display, and in particular, to a panel for the liquid crystal display.

(b) Description of Related Art

Generally, a liquid crystal display (LCD) includes a liquid crystal (LC) panel assembly including two panels provided with two kinds of field generating electrodes such as pixel electrodes and a common electrode and a LC layer with dielectric anisotropy interposed therebetween. The variation of the voltage difference between the field generating electrodes, i.e., the variation in the strength of an electric field generated by the electrodes changes the transmittance of the light passing through the LCD, and thus desired images are obtained by controlling the voltage difference between the electrodes.

However, the LCD involves a critical shortcoming of the narrow viewing angle. In order to overcome such a problem, various techniques for widen the viewing angle have been developed, and among them, a technique of forming cutouts or protrusions at the pixel electrodes and the common electrode while aligning the LC molecules vertical to the upper and lower panels is the strongest candidate for the wide viewing angle technique.

The cutouts provided at the respective pixel electrodes and the common electrode generate fringe fields, which control the tilt directions of the LC molecules are controlled to thereby widen the viewing angle.

The protrusions provided on the respective pixel electrodes and the common electrode deform the electric field, and the tilt directions of the LC molecules are controlled due to the deformed electric field to thereby widen the viewing angle.

Alternatively, the cutouts are provided at the pixel electrodes of a lower panel while protrusions are provided at the common electrode of an upper panel. Fringe fields generated by the cutouts and the protrusions controls the tilt directions of the LC molecules to thereby form multiple domains.

The multi-domain LCD involves a very excellent contrast-based viewing angle or gray inversion-based viewing angle of up to 80° or more in all directions. The contrast-based viewing angle is defined as a viewing angle showing the contrast ratio of 1:10, and the gray inversion-based viewing angle is defined by the limit angle of the inter-gray luminance inversion. However, the multi-domain LCD shows a lateral gamma curve distortion that the front gamma curve and the lateral gamma curve do not agree to each other is made to exhibit deteriorated left and right visibility even compared with the twisted nematic (TN) mode LCD. For instance, the patterned vertically aligned (PVA) mode LCD having cutouts for partitioning domains becomes brighter and color-shifts to white as it goes to the lateral sides. In a serious case, the difference between the bright grays is eradicated, and hence, the images become conglomerated. However, it becomes a critical matter to improve the visibility more and more as the LCD has been recently used for the multimedia purpose to display still or moving picture images.

SUMMARY OF THE INVENTION

A liquid crystal display is provided, which includes: a first insulating substrate; first and second signal lines formed on the first insulating substrate; a third signal line formed on the first insulating substrate and crossing the first and the second signal lines; a first thin film transistor connected to the first and the third signal lines; a second thin film transistor connected to the second and the third signal lines; a first pixel electrode connected to the first thin film transistor; a second pixel electrode connected to the second thin film transistor; a second insulating substrate facing the first insulating substrate; a common electrode formed on the second insulating substrate; a liquid crystal layer interposed between the first and the second insulating substrates and including a first liquid crystal region on the first pixel electrode and a second liquid crystal region on the second pixel electrode; and a domain partitioning member formed on at least one of the first and the second insulating substrates for partitioning the first and the second liquid crystal regions into a plurality of domains, respectively, wherein the domains of each of the first and the second liquid crystal regions includes a first directional domain and a second directional domain, the average directors of liquid crystal molecules in the first and the second directional domains are angled with respect to the first or the second signal line by a predetermined degree of about 0-90°, and the first pixel electrode and the second pixel electrode are capacitively coupled.

It is preferable that the first pixel electrode occupies about 50-80% of an entire area of the first and the second pixel electrodes, and the second thin film transistor is activated after the first thin film transistor is activated.

The threshold voltage of the first pixel electrode is preferably lower than the threshold voltage of the second pixel electrode by about 0.4-1.0V.

The liquid crystal display may further includes a storage electrode line formed on the first substrate and forming storage capacitors along with the first and the second pixel electrodes.

The average director of the liquid crystal molecules in the fist and the second directional domains are preferably angled with respect to the first or the second signal line by about 45°.

Preferably, the liquid crystal display further includes a first polarizer placed on an outer surface of the first substrate and having a polarizing axis parallel to the first or the second signal line, and a second polarizer placed on an outer surface of the second substrate and having a polarizing axis crossing the polarizing axis of the first polarizing plate.

A thin film transistor array panel is provided, which includes: an insulating substrate; first and second gate lines formed on the substrate; a gate insulating layer formed on the first and the second gate lines; a semiconductor layer formed on the gate insulating layer; a data line formed at least on the semiconductor layer and intersecting the gate lines; first and second drain electrodes formed at least on the semiconductor layer and located near the intersection between the first gate line and the data line; third and fourth drain electrodes formed at least on the semiconductor layer and located near the intersection between the second gate line and the data line; a coupling electrode formed on the gate insulating layer; a passivation layer formed on the data line, the first to the fourth drain electrodes, and the coupling electrode and having a plurality of contact holes exposing the first to the fourth drain electrodes and the coupling electrode; a first pixel electrode formed on the passivation layer and connected to the first drain electrode and the coupling electrode; a second pixel electrode formed on the passivation layer and connected to the second drain electrode; a third pixel electrode formed on the passivation layer and connected to the third drain electrode; and a fourth pixel electrode formed on the passivation layer and connected to the fourth drain electrode and partially overlapping the coupling electrode, wherein at least one of the first and the fourth pixel electrodes has an oblique cutout.

A liquid crystal display is provided, which includes: a first insulating substrate; first and second gate lines formed on the first substrate; a gate insulating layer formed on the first and the second gate lines; a semiconductor layer formed on the gate insulating layer; a data line formed at least on the semiconductor layer and intersecting the gate lines; first and second drain electrodes formed at least on the semiconductor layer and located near the intersection between the first gate line and the data line; third and fourth drain electrodes formed at least on the semiconductor layer and located near the intersection between the second gate line and the data line; a coupling electrode formed on the gate insulating layer; a passivation layer formed on the data line, the first to the fourth drain electrodes, and the coupling electrode and having a plurality of contact holes exposing the first to the fourth drain electrodes and the coupling electrode; a first pixel electrode formed on the passivation layer and connected to the first drain electrode and the coupling electrode; a second pixel electrode formed on the passivation layer and connected to the second drain electrode; a third pixel electrode formed on the passivation layer and connected to the third drain electrode; a fourth pixel electrode formed on the passivation layer and connected to the fourth drain electrode and partially overlapping the coupling electrode; a second insulating substrate facing the first insulating substrate; a common electrode formed on the second insulating substrate; a liquid crystal layer interposed between the first and the second insulating substrates; and a domain partitioning member formed on at least one of the first and the second insulating substrates and partitioning the liquid crystal layer into a plurality of domains, wherein two long edges of the domains are angled with respect to the gate line or the data line substantially by about 45°.

Preferably, the first pixel electrode occupies about 50-80% of an entire area of the first and the fourth pixel electrodes and the fourth pixel electrode is supplied with a voltage after the first pixel electrode is supplied with a voltage.

The threshold voltage of the first pixel electrode is preferably lower than the threshold voltage of the fourth pixel electrode by about 0.4-1.0V.

BRIEF DESCRIPTION OF THE DRAWINGS

The above and other advantages of the present invention will become more apparent by describing preferred embodiments thereof in detail with reference to the accompanying drawings in which.

DETAILED DESCRIPTION OF PREFERRED EMBODIMENTS

Figure 1:
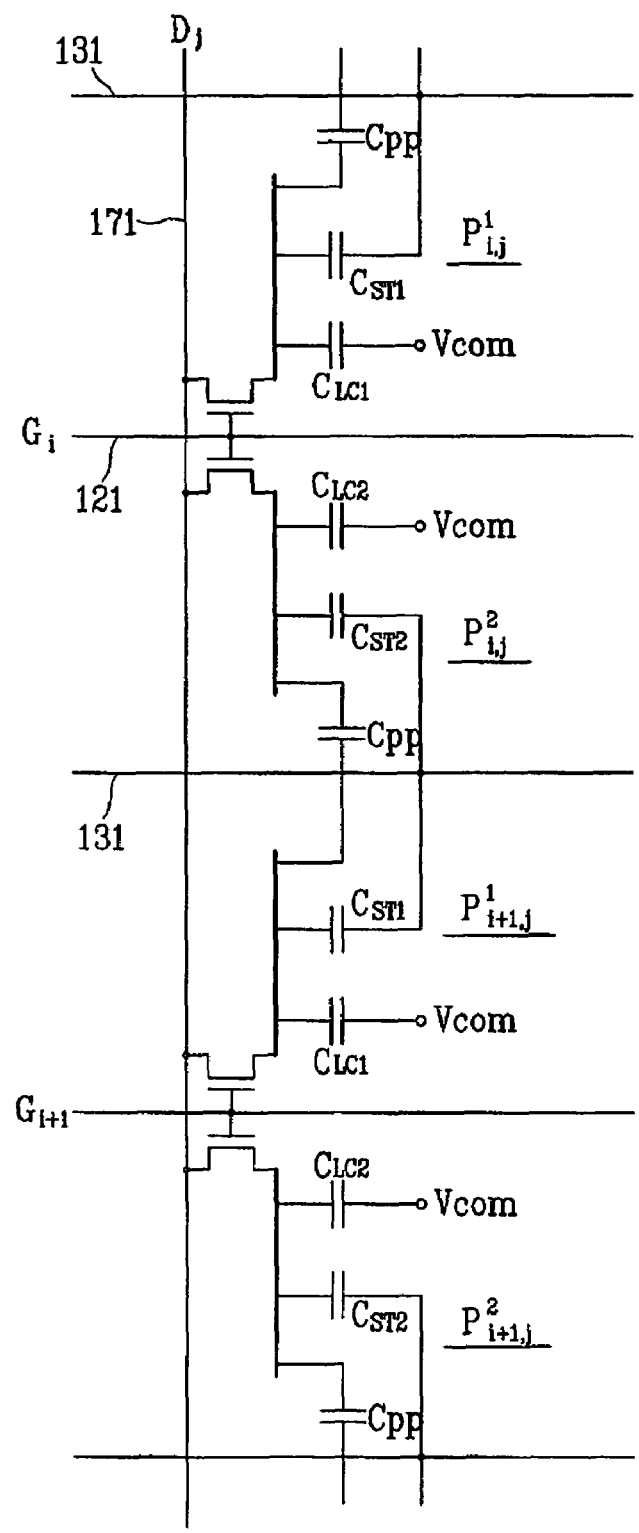
FIG. 1 is a circuit diagram of an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, LCDs according to embodiments of this invention will be described in detail with reference to the accompanying drawings.

FIG. 1 is an equivalent circuit diagram of a pixel of an LCD according to an embodiment of the present invention.

Referring to FIG. 1, an LCD according to an embodiment includes a plurality of display signal lines $G_i$, $D_j$ and 131 and a plurality of pixels connected thereto and arranged substantially in a matrix.

The display signal lines $G_i$ and $D_j$ include a plurality of gate lines $G_i$ transmitting gate signals (called scanning signals) and a plurality of data lines $D_j$ transmitting data signals. The gate lines $G_i$ extend substantially in a row direction and are substantially parallel to each other, and the data lines $D_j$ extend substantially in a column direction and are substantially parallel to each other.

The display signal lines 131 further includes a plurality of storage electrode lines 131 located between the gate lines $G_i$ and between the pixels and supplied with a common voltage Vcom.

Each pixel $P_{ij}$ (i=1, 2, . . . , n and j=1, 2, . . . , m) includes a pair of subpixels $P_{i,j}^1$ and $P_{i,j}^2$, and each subpixel $P_{i,j}^1$ or $P_{i,j}^2$ includes a switching element Q1 or Q2 connected to a pair of one of the gate lines $G_i$ and one of the data lines $D_j$, and an LC capacitor $C_{LC1}$ or $C_{LC2}$ and a storage capacitor $C_{ST1}$ or $C_{ST2}$ that are connected to the switching element Q1 or Q2.

Two adjacent pixels in the column direction are capacitively coupled by a coupling capacitor Cpp. For example, an upper subpixel $P_{i,j}^1$ of a pixel $P_{ij}$ is capacitively coupled with a lower subpixel $P_{i,j}^2$ of an upper pixel $P_{i-1,j}$, and a lower subpixel $P_{i,j}^2$ of a pixel $P_{ij}$ is capacitively coupled with an upper subpixel $P_{i+1,j}^1$ of a lower pixel $P_{i+1,j}$.

The switching element Q1 or Q2 has three terminals: a control terminal connected to one of the gate lines $G_1$-$G_n$; an input terminal connected to one of the data lines $D_0$-$D_m$; and an output terminal connected to the LC capacitor $C_{LC1}$ or $C_{LC2}$, the storage capacitor $C_{ST1}$ or $C_{ST2}$, and the coupling capacitor Cpp.

The LC capacitor $C_{LC1}$ or $C_{LC2}$ is connected between the switching element Q1 or Q2 and a common voltage Vcom. The storage capacitor $C_{ST1}$ or $C_{ST2}$ is connected between the switching element Q1 or Q2 and the storage electrode line 131.

Now, an LC panel assembly for an LCD according to an embodiment of the present invention is described in detail with reference to FIGS. 2 to 3C.

Figure 2:
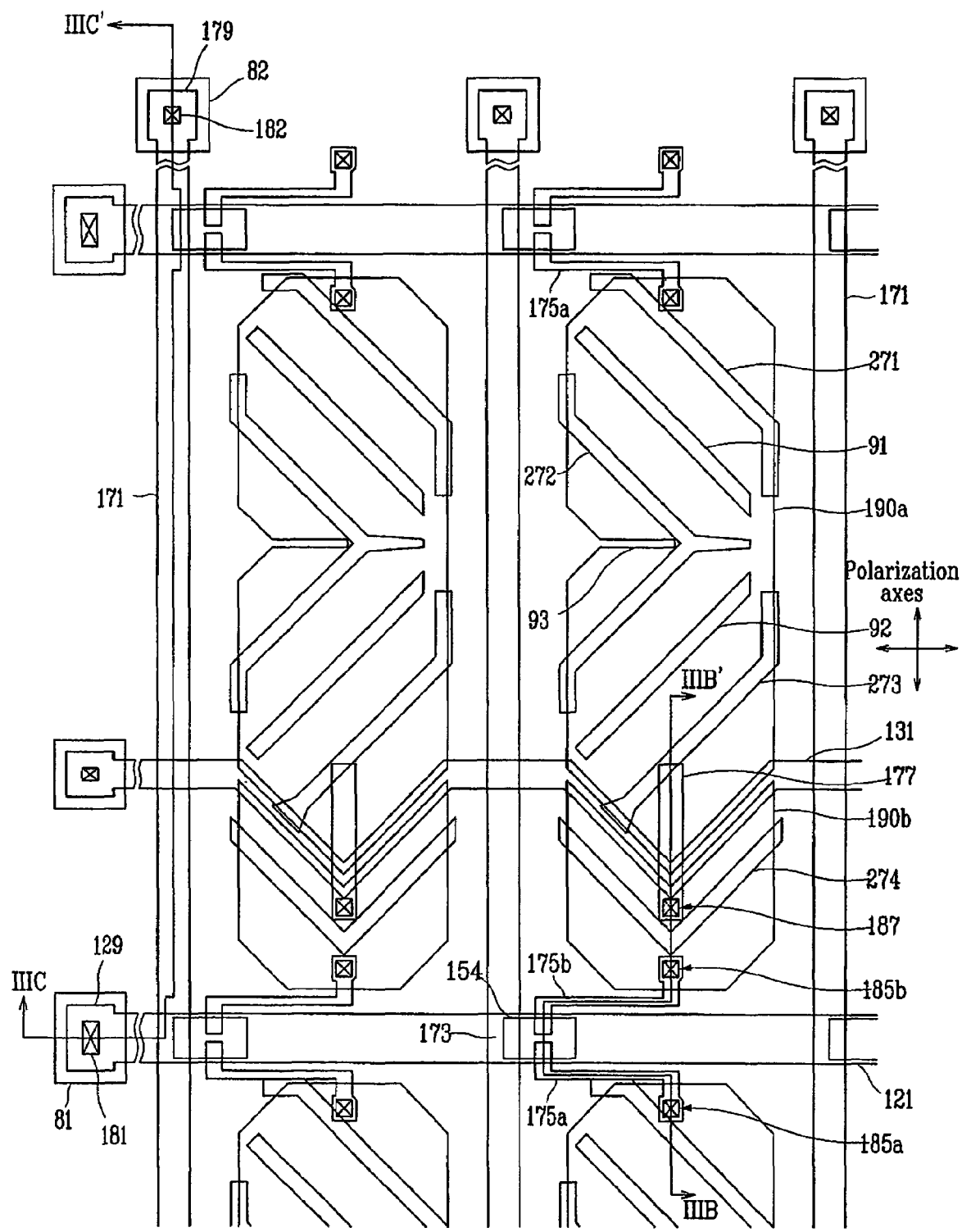
FIG. 2 is a layout view of an LCD according to an embodiment of the present invention.
Figure 3A:
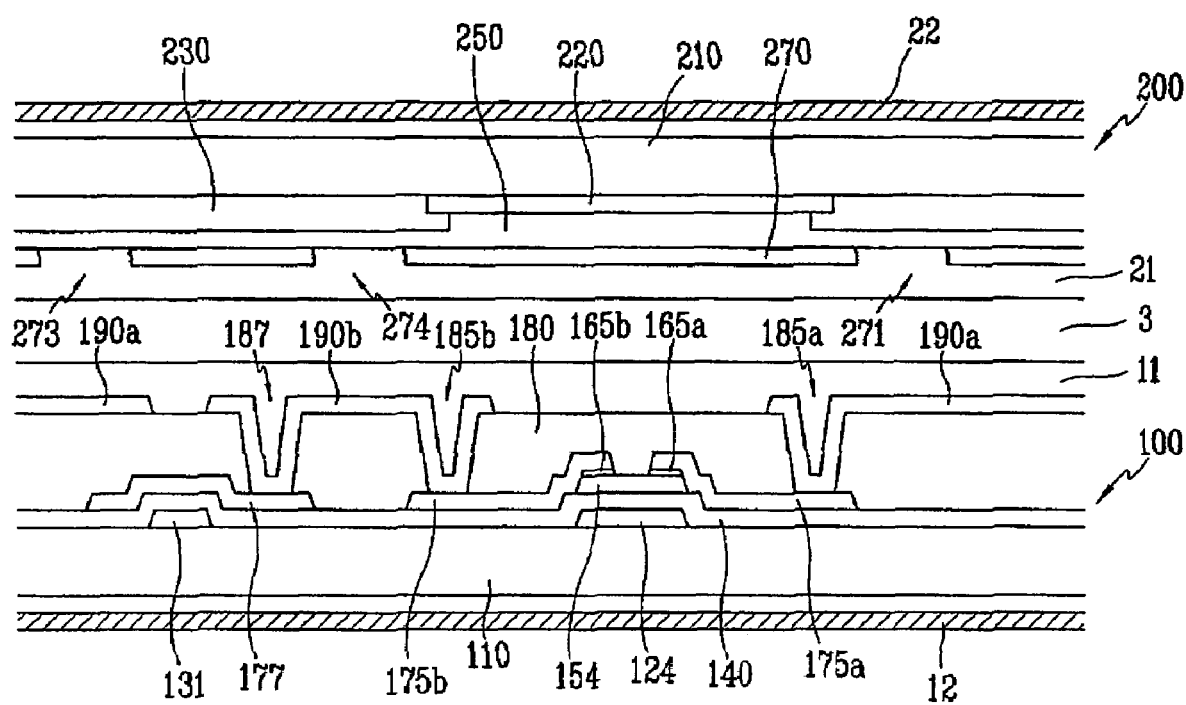
FIG. 3A is a sectional view of the LC panel assembly shown in FIG. 2 taken along the line IIIB-IIIB'.
Figure 3B:
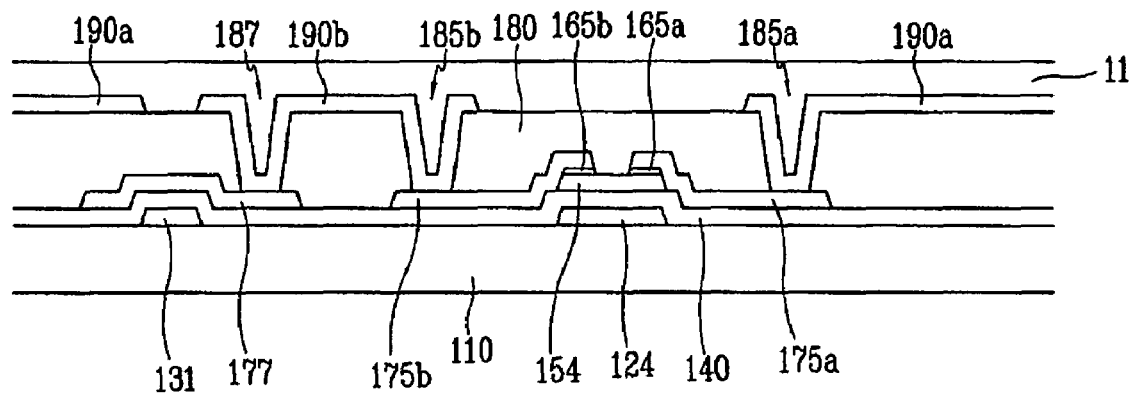
FIG. 3B is a sectional view of a TFT array panel shown in FIG. 3A, which is a portion of the LC panel assembly shown in FIG. 3A except for a color filter array panel and polarization films.

FIG. 2 is a layout view of an LC panel assembly according to an embodiment of the present invention, FIG. 3A is a sectional view of the LC panel assembly shown in FIG. 2 taken along the line IIIB-IIIB', and FIG. 3B is a sectional view of a TFT array panel shown in FIG. 3A, which is a portion of the LC panel assembly shown in FIG. 3A except for a color filter array panel and polarization films. FIG. 3C is a sectional view of a TFT array panel shown in FIG. 2 taken along the line IIIC-IIIC'.

Referring to FIG. 3A, an LC panel assembly according to this embodiment includes a TFT array panel 100, a color filter array panel 200 facing the TFT array panel 100, and an LC layer 3 interposed therebetween.

Figure 3C:
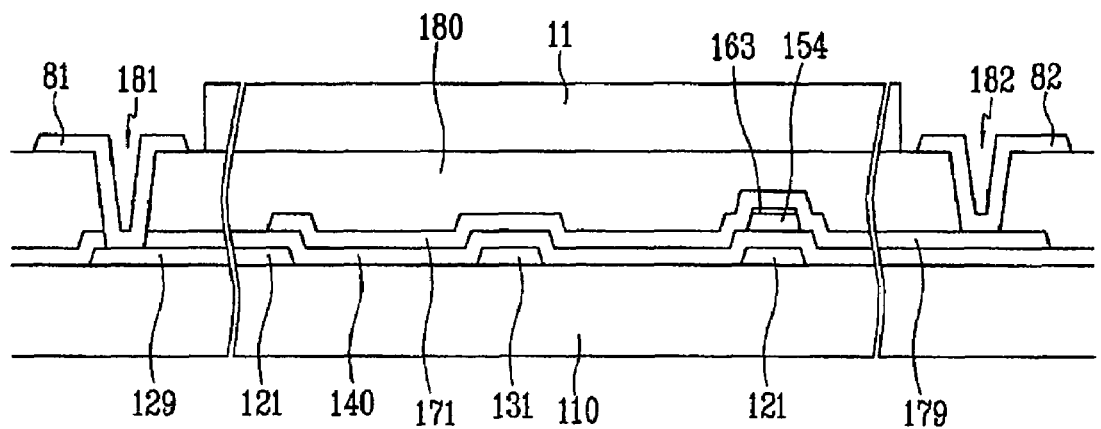
FIG. 3C is a sectional view of a TFT array panel shown in FIG. 2 taken along the line IIIC-IIIC'.

Referring to FIGS. 2 to 3C, the TFT array panel 100 includes a plurality of gate lines 121 and a plurality of storage electrode lines 131 formed on an insulating substrate 110 preferable made of transparent glass. Each gate line 121 extends substantially in a row direction and includes a plurality of gate electrodes 124. The storage electrode lines 131 extend substantially in the row direction and are partially curved.

A gate insulating layer 140 is formed on the gate lines 121 and the storage electrode lines 131, and a plurality of semiconductor islands 154 is formed on the gate insulating layer 140 opposite the gate electrodes 124. Each semiconductor island 154 is preferably made of amorphous silicon ("a-Si") and forms a channel of a TFT. A plurality of ohmic contacts 163, 165a and 165b preferably made of a-Si heavily doped with N type impurity such as phosphorous (P) are formed on the semiconductor islands 154.

A plurality of data lines 171, a plurality of pairs of drain electrodes 175a and 175b, and a plurality of coupling electrodes 177 are formed on the ohmic contacts 163, 165a and 165b and the gate insulating layer 140.

Each data line 171 extends substantially in a column direction and includes a plurality of source electrodes 173, and each source electrode 173 is located opposite a pair of drain electrodes 175a and 175b separated therefrom with respect to the gate electrode 124.

Each pair of drain electrodes 175a and 175b extends opposite directions with respect to the gate line 124.

Each coupling electrode 177 extends in the column direction across the storage electrode line 131.

The portions of the semiconductor islands 154 located between the source electrode 173 and the drain electrodes 175a and 175b are exposed, and the ohmic contacts 163, 165a and 165b are disposed only between the semiconductor islands 154 and the data lines 171 and the drain electrodes 175a and 175b.

A passivation layer 180 is formed on the data lines 171, the drain electrodes 175a and 175b, and the coupling electrodes 177. The passivation layer 180 has a plurality of contact holes 185a and 185b exposing end portions of the drain electrodes 175a and 175b and a plurality of contact holes 187 exposing end portions of the coupling electrodes 177. The passivation layer 180 further has a plurality of contact holes 182 exposing end portions 179 of the data lines 171, and the passivation layer 180 and the gate insulating layer 140 have a plurality of contact holes 181 exposing end portions 129 of the gate lines 121.

A plurality of pairs of pixel electrodes 190a and 190b and a plurality of contact assistants 81 and 92 are formed on the passivation layer 180. The pixel electrodes 190a and 190b and the contact assistants 81 and 92 are preferably made of a transparent conductive material such as indium-tin-oxide (ITO) and indium-zinc-oxide (IZO) or a reflective material.

Each pair of pixel electrodes 190a and 190b includes a lower pixel electrode 190a and an upper pixel electrode 190b connected to the drain electrodes 175a and 175b through the contact holes 185a and 185b, respectively. The upper electrode 190b is connected to the coupling electrode 177 through the contact hole 187 and the lower electrode 190a overlaps the coupling electrode 177 such that the lower pixel electrode 190a of an upper pixel and the upper pixel electrode 190b of a lower pixel are capacitively coupled. In addition, the lower pixel electrode 190a of an upper pixel and the upper pixel electrode 190b of a lower pixel are located opposite across the storage electrodes line 131 and overlap the storage electrode line 131 to form a plurality of storage capacitors. The edges of the pixel electrodes 190a and 190b opposite across the storage electrode line 131 are curved to form V shapes, and the V-shaped edge of the pixel electrode 190a is convex, while that of the pixel electrode 190b is concave.

Each lower pixel electrode 190a has upper, lower and central linear cutouts 91-93. The central cutout 93 is located at the middle portion in the column direction and enters into the pixel electrode 190a from the left to the right, thereby partitioning the pixel electrode 190a into upper and lower partitions. The upper and the lower cutouts 91 and 92 obliquely extend in the upper and the lower partitions, respectively, and are located symmetrically with respect to the central cutout 93.

The contact assistants 81 and 82 are connected to the exposed end portions 129 and 179 of the gate lines 121 and the data lines 171 through the contact holes 181 and 182, respectively, and provided for protecting the exposed end portions 129 and 179 but is optional.

An alignment layer 11 is coated on the entire surface of the TFT array panel 100 except for the contact assistants 81 and 82.

One gate electrode 124, one source electrode 173, and a pair of drain electrodes 175a and 175b along with one semiconductor island 154 form a pair of TFTs respectively connected to the pixel electrodes 190a and 190b.

Referring to FIGS. 2 and 3B, the color filter array panel 200 includes a black matrix 220 formed on an insulating substrate 210 preferably made of transparent glass. The black matrix 220 defines a plurality of windows where a plurality of red, green and blue color filters 230 are formed.

An overcoat is formed on the color filters and a common electrode 270 is formed thereon. The common electrode 270 is preferably made of a transparent conductive material such as ITO and IZO, and has a plurality of sets of four linear cutouts 271-274. Three 271-273 of the cutouts 271-274 overlap the lower pixel electrode 190a to partition the pixel electrode 190a along with the cutouts 91-93 into a plurality of subareas. The cutout 274 having a V shape overlap the upper electrode 190b to bisect the upper pixel electrode 190b into two subareas. An alignment layer 21 is coated on the entire surface of the color filter array panel 200.

Each subarea defined by the cutouts 91-93 and 271-273 has substantially a shape of a tetragon having two major edges making an angle of about 45 degrees with the gate lines 121 and the data lines 171. The subareas defined by edges of the upper pixel electrode 190b and the cutout 274 have V shapes, which are combinations of two tetragons.

A pair of polarizers 12 and 22 are attached to outer surfaces of the panels 100 and 200, respectively. The polarization axes of the polarizers 12 and 22 are crossed and substantially parallel to the gate lines 121 or the data lines 171.

The molecules of the LC layer 3 are aligned such that their major axes are substantially perpendicular to the surfaces of the panels 100 and 200 in absence of electric field.

Referring back to FIG. 1, the difference between the data voltage and the common voltage Vcom applied to a pixel is expressed as a charged voltage of the LC capacitor $C_{LC1}$ or $C_{LC2}$, i.e., a pixel voltage. The LC molecules have orientations depending on the magnitude of the pixel voltage and the orientations determine the polarization of light passing through the LC capacitor $C_{LC1}$ or $C_{LC2}$. The polarizers 11 and 21 convert the light polarization into the light transmittance.

In the meantime, it is assumed that the difference between a data voltage for a pixel Pup and the common voltage Vcom is $d_{up}$ and pixel voltages charged in LC capacitors $C_{LC1}$ and $C_{LC2}$ of the upper and the lower subpixels $P_{up}^1$ and $P_{up}^2$ of the pixel Pup are $V(P_{up}^1)$ and $V(P_{up}^2)$, respectively. In addition, let us assume that the lower subpixel $P_{up}^2$ of the pixel Pup and the upper subpixel $P_{down}^1$ of the pixel Pdown are coupled with a coupling capacitor Cpp, and the difference between the data voltage for the pixel Pdown and the common voltage Vcom is $d_{down}$. Furthermore, after the pixel Pup is supplied with the data voltage, the pixel Pdown is supplied with the data voltage. Then, the following relations are satisfied:

$$V(P_{up}^1) = d_{up}; \text{ and} \quad (1)$$

$$V(P_{up}^2) = d_{up} + \frac{Cpp}{C_{LC2} + C_{ST2} + Cpp} \cdot (d_{down} - d'_{down}). \quad (2)$$

In Equations 1 and 2, $C_{LC2}$ and $C_{ST2}$ are the capacitances of the LC capacitor and the storage capacitor of the lower subpixel $P_{up}^2$, Cpp is the capacitance of the coupling capacitor, and $d'_{down}$ is the difference between the data voltage applied to subpixel $P_{down}^1$ in a previous frame and the common voltage Vcom. For descriptive convenience, the wire resistance and the signal delay of the data lines $D_j$ are ignored.

In Equation 2, if $d_{down}$ and $d'_{down}$ have opposite polarity since $d_{up}$ and $d_{down}$ have the same polarity, the pixel Pdown displays the same gray as the pixel Pup, and the displayed images are still images, $d_{up}=d_{down}=-d'_{down}$ and thus Equation 2 becomes:

$$V(P_{up}^2) = d_{up} + \frac{2d_{up}Cpp}{C_{LC2} + C_{ST2} + Cpp} \quad (3)$$

$$= \frac{C_{LC2} + C_{ST2} + 3Cpp}{C_{LC2} + C_{ST2} + Cpp} d_{up}$$

$$= T_1 d_{up},$$

$$\text{where } T_1 = \frac{C_{LC2} + C_{ST2} + 3Cpp}{C_{LC2} + C_{ST2} + Cpp} > 1.$$

On the contrary, if $d_{up}$ and $d_{down}$ have opposite polarities, the pixel Pdown displays the same gray as the pixel Pup, and the displayed images are still images, Equation 2 becomes:

$$V(P_{up}^2) = d_{up} - \frac{2d_{up}Cpp}{C_{LC2} + C_{ST2} + Cpp} \quad (4)$$

$$= \frac{C_{LC2} + C_{ST2} - Cpp}{C_{LC2} + C_{ST2} + Cpp} d_{up}$$

$$= T_2 d_{up},$$

$$\text{where } T_2 = \frac{C_{LC2} + C_{ST2} - Cpp}{C_{LC2} + C_{ST2} + Cpp} < 1.$$

According to Equations 3 and 4, if a lower subpixel $P_{up}^2$ of a pixel Pup is capacitively coupled with a upper subpixel $P_{down}^1$ of a pixel Pdown, the lower subpixel $P_{up}^2$ of the pixel Pup is charged with a voltage higher than that charged in the upper subpixel $P_{up}^1$ of the pixel Pup when the polarity of the data voltages applied to the two subpixels $P_{up}^2$ and $P_{down}^1$ is the same, and vice versa when the polarity is opposite.

This pixel structure that a pixel includes two switching elements and two LC capacitors and adjacent pixels are capacitively coupled by a coupling capacitor prevents gray inversion at a bottom view and improves visibility at all directions.

Figure 4:
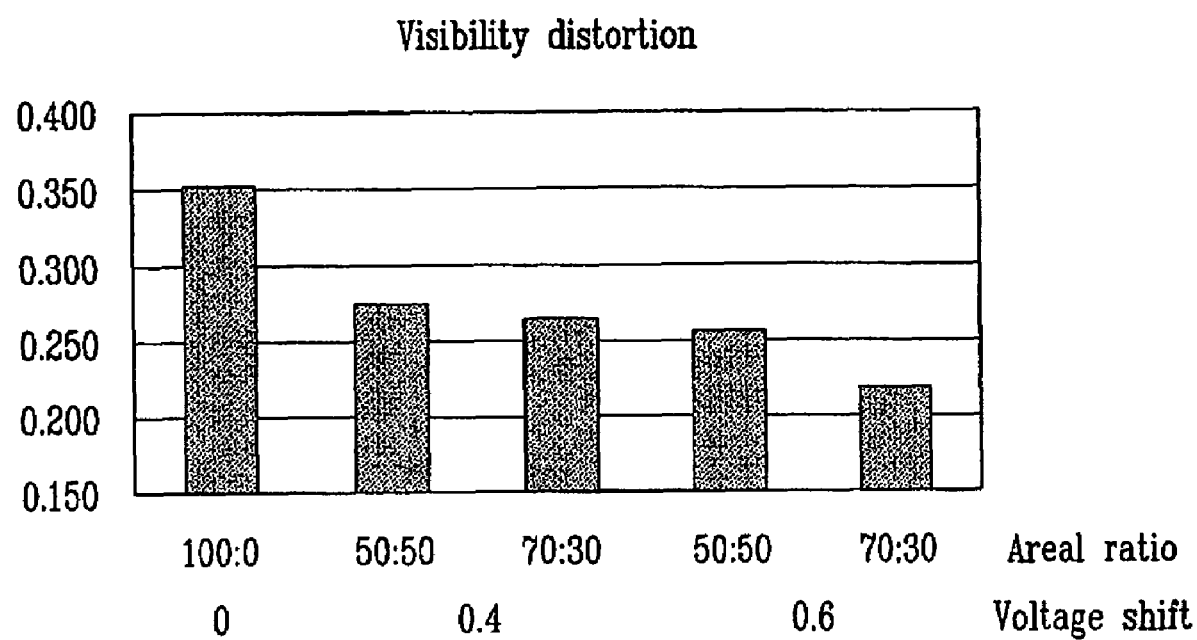
FIG. 4 is a graph illustrating the distortion in the visibility as a function of the voltage shift and the domain ratio.

FIG. 4 is a graph illustrating the distortion in the visibility as function of the voltage shift and the areal ratio of the pixel electrodes.

The vertical axis shown in FIG. 4 indicates the value of quantifying the distortion in the visibility, and the horizontal axis indicates the areal ratio between lower and upper pixel electrodes 190a and 190b for the voltage shifts 0, 0.4V and 0.6V.

The visibility distortion in a range of 0.1-0.2 means that the visibility is exceptionally excellent, which is equal to the level of the cathode ray tube (CRT), and the visibility distortion in a range of 0.2-0.25 means that the visibility is very excellent. The visibility distortion in a range of 0.25-0.3 means that the visibility is excellent, and the visibility distortion in a range of 0.3-0.35 means that the visibility is good. However, the visibility distortion less than about 0.35 means that the visibility is bad, which results in the poor display quality.

It is known from FIG. 4 that an excellent visibility is obtained when the areal ratio of the lower pixel electrode to the upper pixel electrode is in a range of 50:50-80:20, and when the voltage shift is in a range of 0.4-1.0V close to a threshold voltage Vth. That is, the lower pixel electrode is preferably designed to be larger than the upper pixel electrode. However, when the lower pixel electrode is equal to or larger than 80%, various problems such as a flicker phenomenon may be made due to the kick-back voltage or other factors. Furthermore, when the threshold voltage Vth of the lower pixel electrode is lower than the threshold voltage Vth of the upper pixel electrode by 0.4-1.0V, the visibility is improved. The voltage difference between the lower and the upper pixel electrodes for the higher grays may be greater.

Then, the reason why the visibility is improved with the LCD according to the present invention will be now described with reference to FIGS. 5 and 6.

Figure 5:
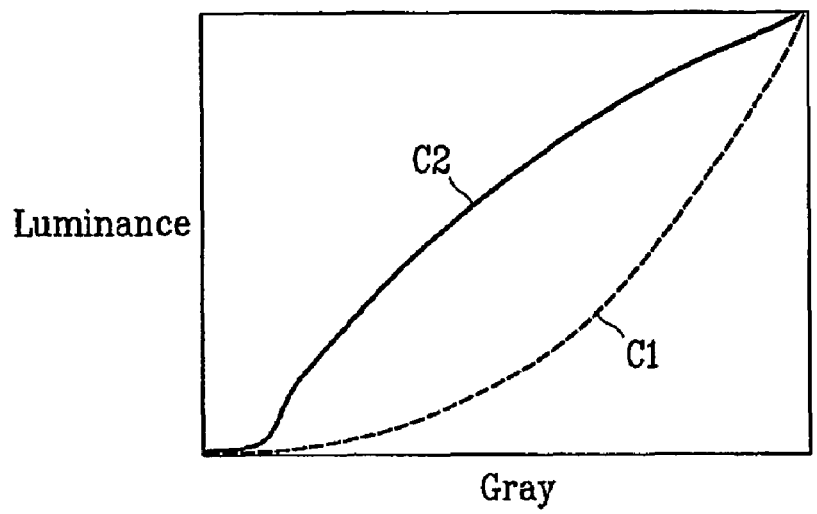
FIG. 5 is a graph illustrating gamma curves for a front view and a lateral view of a conventional patterned-vertically-aligned (PVA) LCD.
Figure 6:
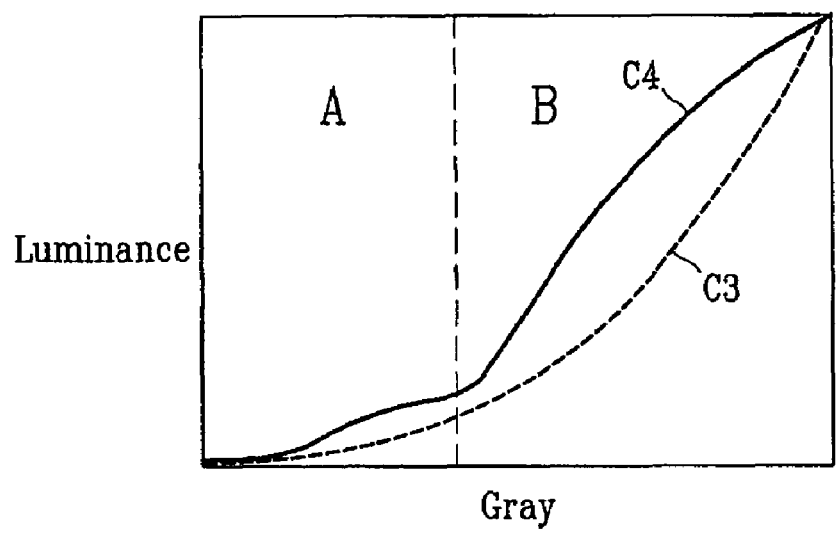
FIG. 6 is a graph illustrating gamma curves for a front view and a lateral view of an LCD according to an embodiment of the present invention.

FIG. 5 is a graph illustrating gamma curves C1 and C2 respectively for a front view and a lateral view of a conventional patterned-vertically-aligned (PVA) LCD, and FIG. 6 is a graph illustrating gamma curves C3 and C4 respectively for a front view and a lateral view of an LCD according to an embodiment of the present invention.

As shown in FIG. 5, the lateral gamma curve C2 of a conventional PVA LCD having one pixel electrode for a pixel is largely deformed upward compared with the front gamma curve C1.

However, according to an embodiment of the present invention, when the data voltage is established such that the pixel voltage applied to the lower subpixel is lower than the usual data voltage, the voltage of the lower subpixel may be kept to be lower than a threshold voltage Vth for some lower grays. Accordingly, the lower subpixel is kept to be in a black state, while the upper subpixel exhibits a transmitting state as indicated by reference character A in FIG. 6. However, since the area of the upper pixel electrode is small, the total luminance is small than that of a conventional LCD. For the gray equal to or larger than a predetermined value (indicated by reference character B), the voltage of the lower subpixel exceeds the threshold voltage Vth, and hence, the lower subpixel also contributes to the total luminance. Therefore, the increase of the luminance depending on the gray increase is enlarged. Accordingly, as shown in FIG. 6, the distortion in the gamma curve becomes decreased.

Figure 7:
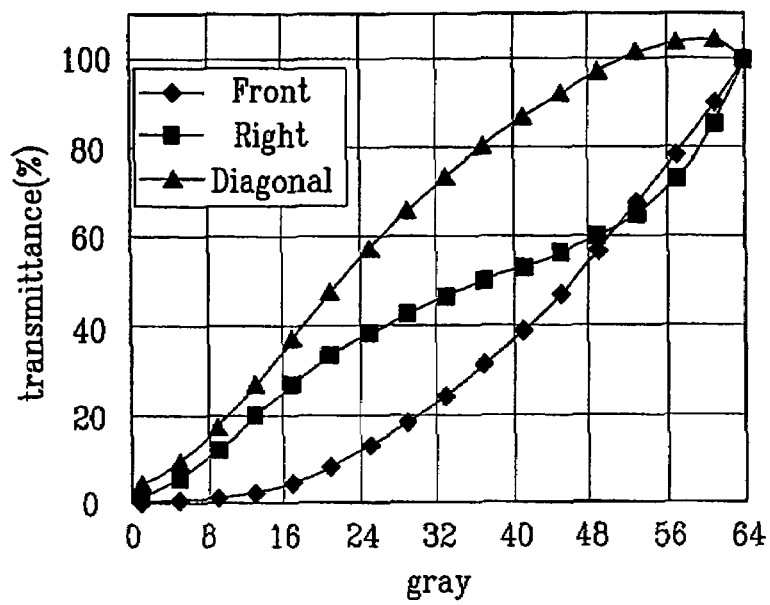
FIG. 7 illustrates measured gamma curves of a conventional PVA mode LCD.
Figure 8:
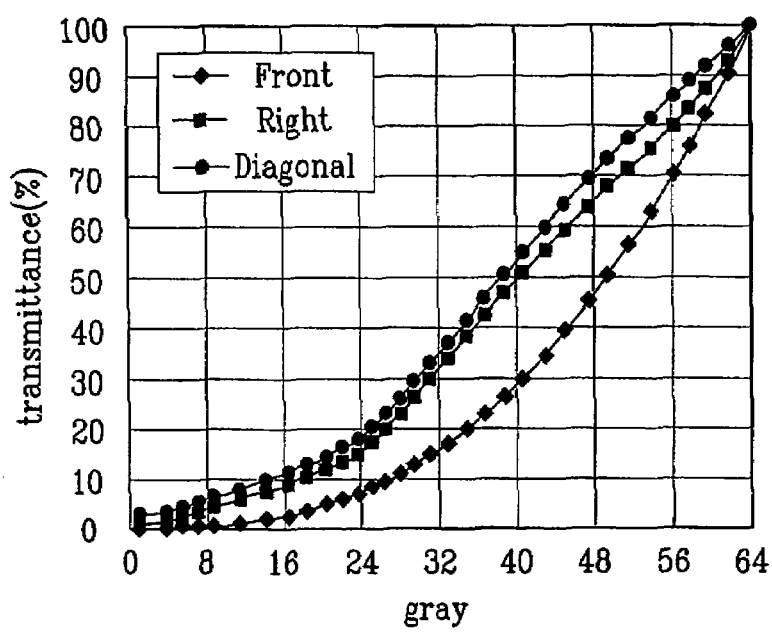
FIG. 8 illustrates measured gamma curves of an LCD according to an embodiment of the present invention.

FIG. 7 illustrates measured gamma curves of a conventional PVA mode LCD, and FIG. 8 illustrates measured gamma curves of an LCD according to an embodiment of the present invention.

Comparing the gamma curves illustrated in FIGS. 7 and 8, it can be known that the gamma curve distortion for all directions of the LCD according to the embodiment of the present invention be smaller than that of the conventional LCD for all directions.

As described above, two pixel electrodes and two TFTs are assigned to one pixel, and the two pixel electrodes of adjacent two pixels are capacitively coupled, thereby improving the visibility in all directions. Furthermore, as the domain partitioning is made such that the average director of the liquid crystal molecules is angled with respect to the gate line or the data line by 45°, polarizers having polarizing axes parallel to the gate line or the data line can be used. Consequently, the production cost for the polarizing plate can be reduced.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display, comprising:
   a first insulating substrate;
   a first signal line formed on the first insulating substrate;
   a second signal line formed on the first insulating substrate;
   a third signal line formed on the first insulating substrate and crossing the first signal line and the second signal line;
   a first thin film transistor connected to the first signal line and the third signal line;
   a second thin film transistor connected to the second signal line and the third signal line;
   a first pixel electrode connected to the first thin film transistor;
   a second pixel electrode connected to the second thin film transistor;
   a second insulating substrate facing the first insulating substrate;
   a common electrode formed on the second insulating substrate;
   a liquid crystal layer interposed between the first insulating substrate and the second insulating substrate and including a first liquid crystal region on the first pixel electrode and a second liquid crystal region on the second pixel electrode,
   a conductive line disposed between the first signal line and the second signal line, wherein a first portion of the conductive line is overlapped by a portion of the first pixel electrode and a second portion of the conductive line is overlapped by a portion of the second pixel electrode; and
   a domain partitioning member formed on at least one of the first insulating substrate and the second insulating substrate and partitioning the first liquid crystal region and the second liquid crystal region into a plurality of domains, respectively.

2. The liquid crystal display of claim 1, wherein the domain partitioning member includes first and second domain members that are oblique to the first and the second signal lines.

3. The liquid crystal display of claim 1, wherein the first pixel electrode occupies about 50-80% of an entire area of the first pixel electrode and the second pixel electrode.

4. The liquid crystal display of claim 1, wherein the second thin film transistor is activated after the first thin film transistor is activated.

5. The liquid crystal display of claim 1, wherein a threshold voltage of the first pixel electrode is lower than that of the second pixel electrode by about 0.4-1.0 V.

6. The liquid crystal display of claim 2, wherein the domains of the first liquid crystal region and the second liquid crystal region include a first directional domain and a second directional domain, and an average director of the liquid crystal molecules in the first directional domain and the second directional domain is slanted at an angle of about 45° with respect to the first or the second signal line.

7. The liquid crystal display of claim 6, further comprising:
   a first polarizer placed on an outer surface of the first substrate and having a polarizing axis parallel to one of the first signal line and the second signal line; and
   a second polarizer placed on an outer surface of the second substrate and having a polarizing axis crossing that of the first polarizer.

8. A thin film transistor array panel comprising:
   an insulating substrate;
   a first gate line on the insulating substrate;
   a second gate lines formed on the insulating substrate;

a gate insulating layer formed on the first gate line and the second gate line;

a semiconductor layer formed on the gate insulating layer;

a data line formed at least on the semiconductor layer and intersecting the first gate line and the second gate line;

first and second drain electrodes formed at least on the semiconductor layer and located near the intersection between the first gate line and the data line;

third and fourth drain electrodes formed at least on the semiconductor layer and located near the intersection between the second gate line and the data line;

first and second coupling electrodes formed on the gate insulating layer;

a passivation layer formed on the data line, the first drain electrode, the second drain electrode, the third drain electrode and the fourth drain electrode and the coupling electrode, and having a plurality of contact holes exposing the first drain electrode, the second drain electrode, the third drain electrode and the fourth drain electrode and the coupling electrode;

a first pixel electrode formed on the passivation layer and connected to the first drain electrode and the first coupling electrode;

a second pixel electrode formed on the passivation layer and connected to the second drain electrode;

a third pixel electrode formed on the passivation layer and connected to the third drain electrode; and a fourth pixel electrode formed on the passivation layer and connected to the fourth drain electrode and partially overlapping the second coupling electrode.

9. The thin film transistor array panel of claim 8, wherein the first coupling electrode overlaps the third pixel electrode.

10. The thin film transistor array panel of claim 9, wherein at least one of the first drain electrode, the second drain electrode, the third drain electrode and the fourth drain electrode has an oblique cutout.

11. A liquid crystal display, comprising:
a first insulating substrate;
a first gate line formed on the first substrate;
a second gate line formed on the first substrate;
a gate insulating layer formed on the first gate line and the second gate line;
a semiconductor layer formed on the gate insulating layer;
a data line formed at least on the semiconductor layer and intersecting the first gate line and the second gate line;
first and second drain electrodes formed at least on the semiconductor layer and located near the intersection between the first gate line and the data line;
third and fourth drain electrodes formed at least on the semiconductor layer and located near the intersection between the second gate line and the data line;
a coupling electrode formed on the gate insulating layer;
a passivation layer formed on the data line, the first drain electrode, the second drain electrode, the third drain electrode, the fourth drain electrode and the coupling electrode, and having a plurality of contact holes exposing the first drain electrode, the second drain electrode, the third drain electrode, the fourth drain electrode and the coupling electrode;
a first pixel electrode formed on the passivation layer and connected to the first drain electrode and the coupling electrode;
a second pixel electrode formed on the passivation layer and connected to the second drain electrode;

a third pixel electrode formed on the passivation layer and connected to the third drain electrode;

a fourth pixel electrode formed on the passivation layer and connected to the fourth drain electrode and partially overlapping the coupling electrode;

a second insulating substrate facing the first insulating substrate;

a common electrode formed on the second insulating substrate;

a liquid crystal layer interposed between the first insulating substrate and the second insulating substrate; and a domain partitioning member formed on at least one of the first insulating substrate and the second insulating substrate and partitioning the liquid crystal layer into a plurality of domains.

12. The liquid crystal display of claim 11, wherein the first pixel electrode occupies about 50-80% of an entire area of the first pixel electrode and the fourth pixel electrode.

13. The liquid crystal display of claim 12, wherein the fourth pixel electrode is supplied with a voltage after the first pixel electrode is supplied with a voltage.

14. The liquid crystal display of claim 11, wherein a threshold voltage of the first pixel electrode is lower than that of the fourth pixel electrode by about 0.4-1.0V.

15. The liquid crystal display of claim 12, wherein two long edges of the domains are slanted at an angle of about 45° with respect to the first gate line and the second gate line or the data line.

16. The liquid crystal display comprising:
a first insulating substrate;
a first signal line formed on the first insulating substrate;
a second signal line formed on the first insulating substrate;
a third signal line formed on the first insulating substrate and crossing the first signal line and the second signal line;
a first thin film transistor connected to the first signal line and the third signal line;
a second thin film transistor connected to the second signal line and the third signal line;
a first pixel electrode connected to the first thin film transistor;
a second pixel electrode connected to the second thin film transistor;
a second insulating substrate facing the first insulating substrate;
a common electrode formed on the second insulating substrate; and
a liquid crystal layer interposed between the first insulating substrate and the second insulating substrate and including a first liquid crystal region on the first pixel electrode and a second liquid crystal region on the second pixel electrode capacitively coupled, wherein
a threshold voltage of the first pixel electrode is lower than that of the second pixel electrode by about 0.4-1.0 V.

17. The liquid crystal display of claim 2, wherein the first and second domain members disposed between the first signal line and the conductive line form an actual or near V shape.

* * * * *